No. 670,996. Patented Apr. 2, 1901.
W. H. MORGAN.
INSECT TRAP.
(Application filed July 5, 1900.)
(No Model.)
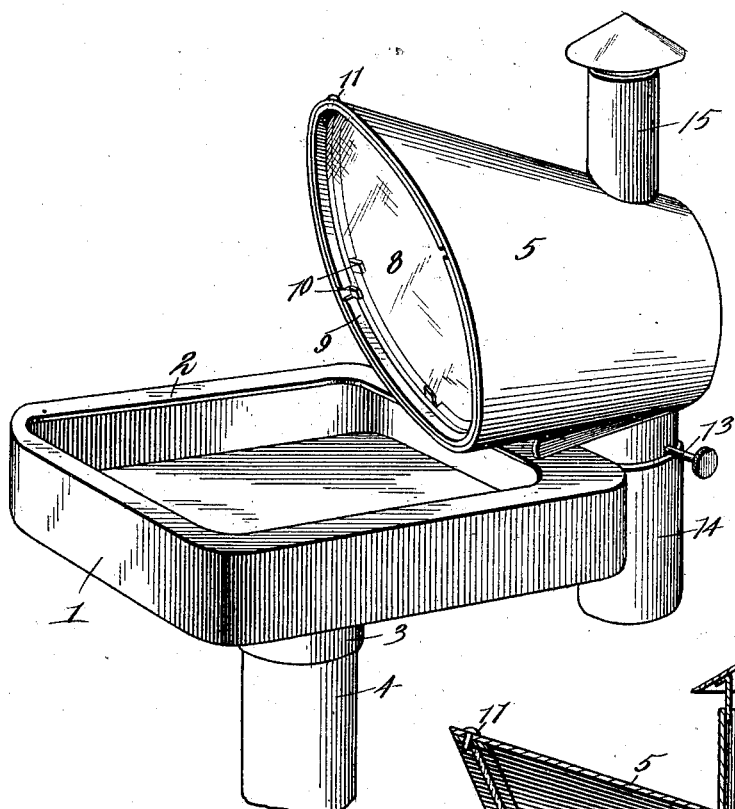
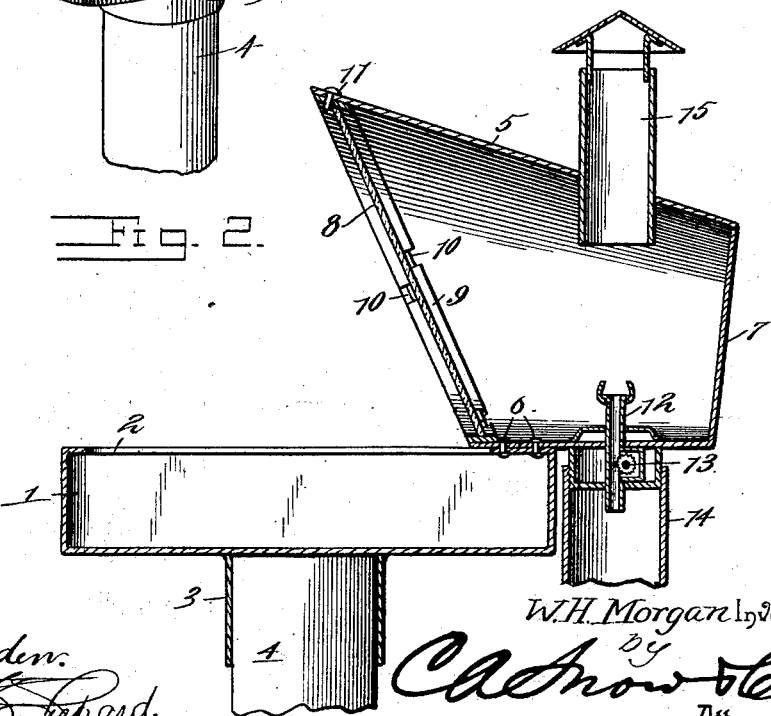
Witnesses
F. E. Alden.
W. H. Morgan Inventor
by
C. A. Snow & Co.
Attorneys

UNITED STATES PATENT OFFICE.

WILLIAM HILL MORGAN, OF PORT ROYAL, KENTUCKY.

INSECT-TRAP.

SPECIFICATION forming part of Letters Patent No. 670,996, dated April 2, 1901.

Application filed July 5, 1900. Serial No. 22,591. (No model.)

*To all whom it may concern:*

Be it known that I, WILLIAM HILL MORGAN, a citizen of the United States, residing at Port Royal, in the county of Henry and State of Kentucky, have invented a new and useful Insect-Trap, of which the following is a specification.

This invention relates to insect-traps, and has for its object to provide an improved device of this character which is especially designed for use in tobacco-fields, so as to attract the tobacco-moth and other insects and drown them in a receptacle forming part of the trap. It is furthermore designed to provide an improved arrangement of lantern or lamp to attract the insects, so that the former may be conveniently cleaned without entirely removing the same from the trap, and the oil-fount may be removed to be filled with oil without removing other parts of the device. Also the lamp is arranged so that the receptacle for containing a liquid to drown the insects is unobstructed to insure the catching of the insects and to facilitate the cleansing of the receptacle.

With these and other objects in view the present invention consists in the combination and arrangement of parts, as will be hereinafter more fully described, shown in the accompanying drawings, and particularly pointed out in the appended claim, it being understood that changes in the form, proportion, size, and minor details may be made within the scope of the claim without departing from the spirit or sacrificing any of the advantages of the invention.

In the drawings, Figure 1 is a perspective view of an insect-destroyer constructed and arranged in accordance with the present invention. Fig. 2 is a central longitudinal sectional view thereof.

Corresponding parts are designated by like characters of reference in both figures of the drawings.

Referring to the accompanying drawings, 1 designates a shallow pan or receptacle having a marginal inwardly-directed flange 2 surrounding the open upper side thereof. Secured centrally to the bottom of the pan is a downwardly-directed socket 3 to receive the upper end of a post or stake 4, which is driven in the ground, so as to support the trap a suitable distance above the ground.

The lamp or lantern for attracting the insects to the trap is located at one end of the pan or receptacle and comprises a substantially conical-shaped reflector 5, the lower side of which is supported upon the adjacent portion of the flange 2 and is connected thereto by means of rivets or other fastenings 6, as best indicated in Fig. 1 of the drawings. The outer or rear end of the reflector is closed by means of an end wall 7, and the opposite inner end is closed by means of a glass or transparent cover 8. It will be noted that the upper side of the reflector is longer than the lower side and overhangs the pan 1, and the glass cover is fitted to this inclined open end so as to incline upwardly and outwardly, thereby overhanging the pan and directing into the same such insects as may fly against the glass in an endeavor to reach the flame of the lamp. The glass cover is fitted within a flat metal ring 9, which is provided at opposite edges with pairs of ears or rings 10, which are struck up from the ring or band, so as to embrace opposite sides of the glass, to connect the latter to the ring or band. The lower portion of the band rests against one of the fastenings 6 to prevent inward displacement of the glass, while the upper portion thereof is provided with a perforation for the removable reception of a pin or key 11, which holds the upper edge of the glass within the reflector. The wick-tube 12 extends through the bottom of the reflector and is located outwardly beyond the rear end of the pan or receptacle, so that the wick-shaft 13 is located in position for convenient access. Also the oil fount or reservoir 14 is removably connected to the wick-tube, so that it may be removed for filling with oil without disturbing any of the other parts of the device. Located above the wick-tube is a chimney 15, which extends upwardly through the upper side of the reflector, so as to provide the proper draft for the lamp.

It will be understood that the pan or receptacle is to be provided with a mixture of common kerosene-oil and water to drown the insects which may fall into the pan. When the lamp has been lighted, the insects will be attracted toward the light, which is rendered intense by means of the reflector, and in endeavoring to reach the flame the insects will fly against the glass cover 8, whereby they are stunned and will drop into the liquid contained within the pan. It will now be apparent that by having the glass cover inclined to overhang the pan the insects will be effectively directed into said pan, so as to prevent the escape of any insects which may fly against the glass.

What is claimed is—

An insect-trap of the class described, comprising a pan, having an open upper side, an inwardly-directed marginal flange extending around the upper edge of the pan, a pole-socket upon the under side of the pan, a tubular reflector secured to the marginal flange and projecting at the outer side of the pan, a transparent cover for the inner end of the reflector, a lamp-burner carried by the bottom of the reflector and exteriorly of the pan, and a removable oil-reservoir connected to the burner and at one side of the pan.

In testimony that I claim the foregoing as my own I have hereto affixed my signature in the presence of two witnesses.

WILLIAM HILL MORGAN.

Witnesses:
W. J. GURLITZ,
R. W. PORTER.